US012749998B2

(12) United States Patent
Luo et al.

(10) Patent No.: US 12,749,998 B2
(45) Date of Patent: Sep. 29, 2026

(54) SLEW RATE CONTROLLABLE SYSTEM FOR POWERING ELECTRIC MACHINE

(71) Applicant: GM GLOBAL TECHNOLOGY OPERATIONS LLC, Detroit, MI (US)

(72) Inventors: Yilun Luo, Ann Arbor, MI (US); Khorshed Mohammed Alam, Canton, MI (US); Eric B. Gach, Clarkston, MI (US); Chandra S. Namuduri, Troy, MI (US); Rashmi Prasad, Troy, MI (US); Mohammad F. Momen, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 491 days.

(21) Appl. No.: 18/476,723

(22) Filed: Sep. 28, 2023

(65) Prior Publication Data

US 2025/0112580 A1 Apr. 3, 2025

(51) Int. Cl.

*H02P 27/08* (2006.01)
*B60L 15/00* (2006.01)
*H02M 1/08* (2006.01)
*H02M 7/5395* (2006.01)

(52) U.S. Cl.

CPC .......... *H02P 27/085* (2013.01); *B60L 15/007* (2013.01); *H02M 1/08* (2013.01); *H02M 7/5395* (2013.01); *B60L 2210/40* (2013.01)

(58) Field of Classification Search

CPC .... H02M 1/08; H02M 1/0029; H02M 7/5395; B60L 15/007; B60L 2210/40; H02P 27/08; H02P 27/085

USPC .......................................................... 318/504

See application file for complete search history.

(56) References Cited

U.S. PATENT DOCUMENTS 9,869,722 B1 1/2018 Morris
10,495,050 B2 12/2019 Alpe
10,505,538 B1 * 12/2019 Alam .............. H03K 19/00369
11,444,613 B1 9/2022 Li
11,695,408 B2 * 7/2023 Chen ................ H03K 17/04206 327/109
2013/0278298 A1 10/2013 Curbelo
2013/0301326 A1 * 11/2013 Zoels ..................... H10D 89/60 327/108
2013/0328596 A1 12/2013 Zoels et al.
2018/0269869 A1 9/2018 Mukhopadhyay
2019/0157993 A1 * 5/2019 Neuhaus ................. H02P 29/50
2019/0238129 A1 * 8/2019 Fukushima ............. H02M 1/08
2022/0038093 A1 * 2/2022 Hart ..................... H03K 17/168
2023/0194593 A1 6/2023 Somayajula et al.

(Continued)

FOREIGN PATENT DOCUMENTS

DE 102014224875 A1 12/2015
DE 102015116690 A1 4/2016

(Continued)

*Primary Examiner* — Gabriel Agared

(74) *Attorney, Agent, or Firm* — Quinn IP Law

(57) ABSTRACT

A slew rate controllable system for powering an electric machine. The system may include a plurality of power switches operable for converting a direct current (DC) input into an alternating current (AC) output suitable for electrically powering the electric machine. The system may include a gate drive system operable for controlling a slew rate associated with transitioning the switches between opened and closed states.

20 Claims, 3 Drawing Sheets

(56) References Cited

U.S. PATENT DOCUMENTS

| | | | |
|---|---|---|---|
| 2023/0261646 | A1 | 8/2023 | Tsuji |
| 2024/0204776 | A1 | 6/2024 | Mitsuhira |

FOREIGN PATENT DOCUMENTS

| | | | |
|---|---|---|---|
| DE | 102017212830 | A1 | 2/2018 |
| DE | 102020100349 | A1 | 8/2020 |
| DE | 112013002431 | B4 | 7/2023 |
| EP | 3654531 | A1 | 5/2020 |

* cited by examiner

SLEW RATE CONTROLLABLE SYSTEM FOR POWERING ELECTRIC MACHINE

INTRODUCTION

The present disclosure relates to systems configured for powering an electric machine, such as but not necessarily limited to a slew rate controllable system configured for managing transitions of power switches operating to provide electrical power to a traction motor of an electric vehicle.

In a power inversion process, pulse width modulation, pulse density modulation, delta-sigma modulation, pulse-frequency modulation, or other application-suitable binary (on/off) switching control signals may be employed to facilitate transitioning switches between different states for purposes of powering an electric machine. The control signals, for example, may alternate a conducting state of the switches to generate electrical power having an AC voltage waveform. Some of the more common switches used in higher power applications, such as those used for electrically powering a traction motor of an electric vehicle, may be voltage and/or current controlled between states. A wide bandgap (WBG), GaN, SiC, and other semiconductors, such as metal oxide field-effect transistor (MOSFET) and the insulated-gate bipolar transistor (IGBT) semiconductors may form a class of switches capable of supporting a wide variety of switching events. The rate, speed, timing, etc. of the switching events, or more specifically the transitioning of the switches between on and off or opened and closed states, may be characterized as a slew rate. Depending on a type of electric machine being powered, such as for example when powering a traction motor used for propelling an electric vehicle, an ability to finely select and control the slew rate may be beneficial in minimizing second order effects, such as overvoltage spikes, electromagnetic interference (EMI) bearing current, voltage overshoot, etc.

SUMMARY

One non-limiting aspect of the present disclosure relates to a slew rate controllable system configured for finely selecting and controlling a slew rate for switches used in powering an electric machine. The slew rate controllable system may be particularly beneficial in accurately controlling the slew rate of power switches, transistors, etc. used in facilitating powering of a traction motor of the type commonly employed for propelling an electric vehicle. The slew rate controllable system may dynamically adjust and precisely control the slew rates according to a wide variety of operating and performance and considerations to provide differing switching speeds capable of balancing high switching slew rates relative to performance benefits and the operating environment.

One non-limiting aspect of the present disclosure relates to a slew rate controllable system for powering an electric machine. The slew rate controllable system may include a plurality of power switches operable for converting a direct current (DC) input into an alternating current (AC) output suitable for electrically powering the electric machine, with the power switches operable between an opened state and a closed state to facilitate generating the AC output. The slew rate controllable system may further include a gate drive system operable for controlling a slew rate associated with transitioning the power switches between the opened and closed states. The gate drive system may include a plurality of gate drive circuits individually connected to a gate terminal of an associated one of the power switches. The gate drive circuits may include a plurality of resistors combinations available connectable to the gate terminal of the associated one of the power switches such that a selected resistor combination of the resistor combinations may be used to set the slew rate for the switch associated therewith.

The gate drive system may include a gate controller operable for determining the selected resistor combination for each power switch to optimize the slew rate.

The gate drive system may include a gate driver operable for providing the gate drive circuits with a control signal suitable for implementing the selected resistor combination and controlling the power switches to generate the AC output.

The control signals may be operable for directing the gate drive circuits to control a gate-source voltage (Vgs) between the gate terminal and a source terminal of the switch associated therewith, the Vgs controlling the power switches between the opened and closed states.

The gate drive circuits may include the resistors such that a quantity of the resistors for each of the gate drive circuits equals K, with a K/2 quantity of the resistors corresponding with upper resistors and a K/2 quantity of the resistors corresponding with lower resistors, optionally with the upper resistors connecting in series with the lower resistors, with the gate terminal associated therewith connecting between each of the upper and lower resistors.

The resistors for each of the gate drive circuits may be arranged into a K/2 quantity of branches, with each branch including one of the upper resistors and one of the lower resistors.

The gate drive system may singularly include an upper voltage source and a lower voltage source for each branch.

The gate drive system may separately include an upper voltage source and a lower voltage source for each branch.

The branches may include an upper gate switch and a lower gate switch, with the upper gate switches connecting in series between one of the upper voltage sources and one the upper resistors and the lower gate switches connecting in series between one of the lower voltage sources and one of the lower resistors.

The gate drive circuits may provide a gate voltage to the gate terminal connected therewith, the gate voltage being proportional to a voltage difference between the upper and lower voltage sources and resistances of the selected combination of resistors.

The control signals may be configured to selectively control the upper and lower gate switches between opened and closed states and thereby the selected combination of resistors.

The control signals may be pulse width modulated (PWM) signals operable between a high voltage and a low voltage, the high voltage transitioning the upper or lower gate switch in receipt thereof to the opened state and the low voltage transitioning the upper or lower switch in receipt thereof to the closed state.

The slew rate controllable system may include a DC link capacitor connected between the power switches and a DC source providing the DC input, optionally with the gate controller selecting the control signals to optimize discharge speed of the DC link capacitor to avoid or minimize voltage overshoot of the power switches when transitioning between the opened and closed states.

The gate controller may be configured for selecting the control signals as a function of one or more of a DC voltage of the DC source, a temperature of the DC link capacitor, a current of one or more of the AC output and a junction temperature, a maximum discharge time, a drain-source voltage (Vds), or a voltage threshold (Vth) of one or more of the power switches.

One non-limiting aspect of the present disclosure relates to a method for controlling slew rates of power inverter module operable for powering an electric machine. The power inverter module may include a plurality of power switches operable for converting a DC input to an AC output suitable for powering the electric machine. The method may include determining a plurality of resistors combinations available for a plurality of gate drive circuits individually connected to a gate terminal of an associated one of the power switches, determining a selected slew rate for the power switches, determining a selected resistor combination of the resistor combinations suitable for implementing the selected slew rate, and generating control signals for the gate drive circuits to implement the selected resistor combination and control conversion of the DC input to the AC output.

The method may include selecting the desired slew rate as a function of one or more of a DC voltage of a DC source providing the DC input, a temperature of a DC link capacitor connected to the DC input, a current of the AC output and a junction temperature, a maximum discharge time, a drain-source voltage (Vds), or a voltage threshold (Vth) of one or more of the power switches.

The method may include a quantity of the resistors for each of the gate drive circuits equals K, with a K/2 quantity of the resistors corresponding with upper resistors and a K/2 quantity of the resistors corresponding with lower resistors, optionally with the upper resistors connecting in series with the lower resistors and the gate terminal associated therewith connecting between each of the upper and lower resistors.

One non-limiting aspect of the present disclosure relates to a power inverter module having controllable slew rates. The power inverter module may include a plurality of power switches operable for converting a direct current (DC) input into an alternating current (AC) output suitable for electrically powering a traction motor of a vehicle, with the power switches being operable between an opened state and a closed state to facilitate generating the AC output. The power inverter module may further include a gate drive system operable for controlling a slew rate associated with transitioning the power switches between the opened and closed states. The gate drive system may include a plurality of gate drive circuits individually connected to a gate terminal of an associated one of the power switches. The gate drive circuits may include a plurality of resistors combinations available connectable to the gate terminal of the associated one of the power switches, wherein a selected resistor combination of the resistor combinations sets the slew rate for the switch associated therewith.

The gate drive system may generate pulse width modulated (PWM) signals for controlling a plurality of gate switches of the gate drive circuits to control the slew rate and the AC output, optionally with the PWM signals operable between a high voltage for transitioning the gate switch in receipt thereof to the opened state and a low voltage for transitioning the gate switch in receipt thereof to the closed state.

The power inverter module a may include a quantity of resistors forming the resistor combinations for each of the gate drive circuits equals K, with a K/2 quantity of the resistors corresponding with upper resistors and a K/2 quantity of the resistors corresponding with lower resistors, optionally with the upper resistors connecting to an upper voltage source via one of the gate switches, the lower resistors connecting to a lower voltage source via another one of the gate switches, and the upper resistors connecting in series with the lower resistors with the gate terminal associated therewith connecting therebetween.

These features and advantages, along with other features and advantages of the present teachings, may be readily apparent from the following detailed description of the modes for carrying out the present teachings when taken in connection with the accompanying drawings. It should be understood that even though the following figures and embodiments may be separately described, single features thereof may be combined to additional embodiments.

BRIEF DESCRIPTION OF THE DRAWINGS

The accompanying drawings, which may be incorporated into and constitute a part of this specification, illustrate implementations of the disclosure and together with the description, serve to explain the principles of the disclosure.

DETAILED DESCRIPTION

As required, detailed embodiments of the present disclosure may be disclosed herein; however, it may be understood that the disclosed embodiments may be merely exemplary of the disclosure that may be embodied in various and alternative forms. The figures may not be necessarily to scale; some features may be exaggerated or minimized to show details of particular components. Therefore, specific structural and functional details disclosed herein may need not to be interpreted as limiting, but merely as a representative basis for teaching one skilled in the art to variously employ the present disclosure.

Figure 1:
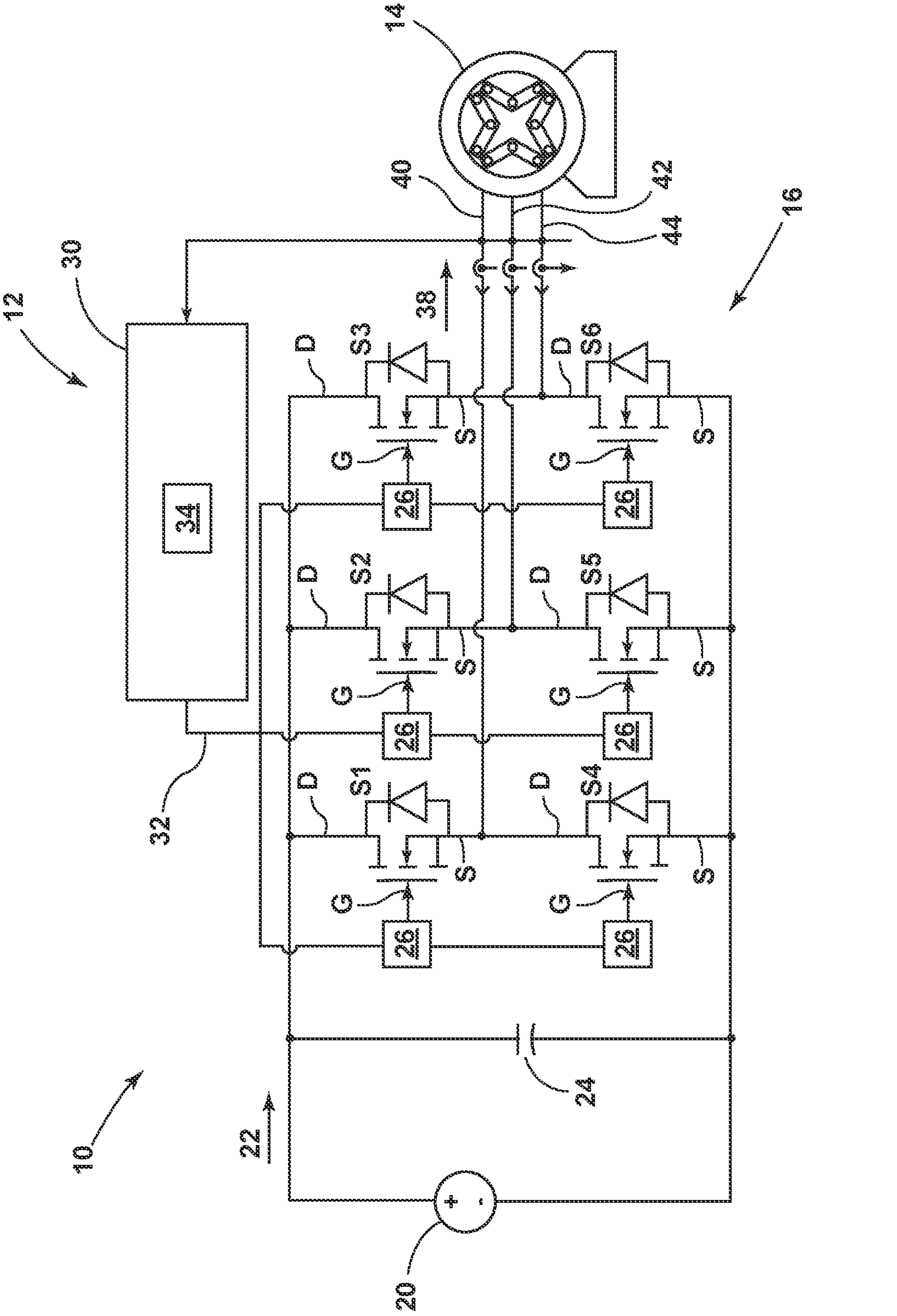
FIG. 1 illustrates a partial schematic view of a slew rate controllable system in accordance with one non-limiting aspect of the present disclosure.

FIG. 1 illustrates a partial schematic view of a slew rate controllable system 10 in accordance with one non-limiting aspect of the present disclosure. The system 10 may include a gate drive system 16 operable for powering an electric machine 14, which for exemplary purposes is predominantly described as an electric motor 14, typically referred to as a traction motor 14. The traction motor 14 may be of the type employed within a vehicle, such as an electric vehicle, to provide mechanical, tractive force operable for propelling the vehicle or otherwise performing work. As described in greater detail below, the gate drive system 12 may be operable for finely selecting and controlling a slew rate for a plurality of power switches, transistors, etc. S1, S2, . . . S6 used as part of a power inverter module (PIM) 16 to facilitate powering the electric machine 14. The system 12 may dynamically adjust and precisely control the slew rates according to a wide variety of operating and performance considerations to provide differing switching speeds capable of balancing high switching slew rates relative to performance benefits and the operating environment. While predominately described with respect to selectively control slew rates for power switches S1, S2, . . . S6 used in an electric vehicle, one skilled in the art would readily recognize the capabilities of the system 12 being advantageous in facilitating powering of other types of electric machines 14 that would similarly benefit from minimizing second order effects, such as overvoltage spikes, electromagnetic interference (EMI) bearing current, voltage overshoot, etc.

The vehicle may include a rechargeable energy storage system (RESS) 20 for storing and supplying electrical power for various systems included onboard the vehicle. The RESS 20 may be a battery or other energy storage device capable of selectively supplying electrical power to and receiving electrical power from the electric machine 14 via the PIM 16. When powering the electric machine 14, the RESS 20 may be configured as a source for providing a direct current (DC) input 22 to the PIM 16. A DC link capacitor 24 may be disposed therebetween to smooth, filter, and otherwise process the DC input 22 for use with the PIM 16. The PIM 16 shown to include six power transistors/power switches S1, S2, . . . S6, each having a gate terminal G, a drain terminal D, and a source terminal S. The gate terminal G of each switch S1, S2, . . . S6 may each be separately and independently connected to one of a plurality of gate drive circuits 26. The power switches S1, S2, . . . S6 may corresponding with a broad range of power switches S1, S2, . . . S6, including wide bandgap (WBG), GaN, SiC, and other similar semiconductors, such as metal oxide field-effect transistor (MOSFET) and the insulated-gate bipolar transistor (IGBT) semiconductors. The gate drive system 12 may include a gate controller 30 operable for individually and specifically controlling the gate drive circuits 26 to control a rate, speed, timing, etc. of switching events for the power switches S1, S2, . . . S6, i.e., to control transitioning of the power switches S1, S2, . . . S6 between on and off or opened and closed states. The transitioning of the power switches S1, S2, . . . S6 between states may be characterized as a slew rate, with the gate drive circuits 26 being operable to individually select the slew rate for each of the power switches S1, S2, . . . S6 according to corresponding control signals 32 provided from the gate controller 30. One non-limiting aspect of the present disclosure contemplates the gate drive circuits 26 being operable for providing a gate voltage and/or a gate current to the gate terminal G associated therewith, with the corresponding gate voltage or gate current being operable to transition the associated switch S1, S2, . . . S6 between opened and closed states, i.e., to control whether the corresponding switch S1, S2, . . . S6 is active or inactive.

The gate controller 30 may include a gate driver 34 configured for individually providing the control signals 32 to each of the gate drive circuits 26. The gate driver 34 may be used in this manner to facilitate switching events for the power switches S1, S2, . . . S6 whereby the DC input 22 may be converted to an alternating current (AC) output 38. The AC output 38 may be generated in the illustrated manner to provide a polyphase output having a plurality of AC signals 40, 42, 44 suitable for use in powering the electric machine 14, which are shown for non-limiting purposes to correspond with a three-phase implementation where a three-phase AC output 38 is provided to an AC bus or windings of the electric machine 14, such as via a corresponding input terminal for the associated AC input. As noted above, the use of the gate drive system 12 to facilitate a controllable slew rate based methodology for controlling switching events, and thereby conversion of a DC input 22 to AC outputs 38 suitable for powering the electric machine 14 is presented for non-limiting purposes as the present disclosure fully contemplates the gate drive system 12 being operable in other environments and for other purpose. The present disclosure, as such, fully contemplates use of the gate drive system 12 to control slew rates for power switches S1, S2, . . . S6 or other devices in addition to the illustrated use case where the power switches S1, S2, . . . S6 may be configured to operate as a unidirectional or bidirectional DC/AC converter.

The gate controller 30 may include a non-transitory computer-readable storage medium having a plurality of non-transitory instructions stored thereon, which when executed with an associated one or more processors, may be operable in accordance with the present disclosure to facilitate generating the control signals 32 in a manner that provides a desirable slew rate while also managing the AC outputs needed for proper powering of the electric machine 14. While not shown in individual detail, a plurality of sensors or other features may be employed to facilitate measuring or otherwise determining a DC voltage of the DC source 20, a temperature of the DC link capacitor 24, a current of one or more of the AC outputs 38, and a junction temperature, a maximum discharge time, a drain-source voltage (Vds), a voltage threshold (Vth) of one or more of the switches/power transistors S1, S2, . . . S6. The gate controller 30 may process the sensor measurements, metrics, etc. to determine a desirable slew rate for each of the power switches S1, S2, . . . S6, which may include selecting the control signals 32 to optimize a discharge speed of the DC link capacitor 24 to avoid or minimize voltage overshoot for the power switches S1, S2, . . . S6 when transitioning between the opened and closed states. The gate controller 30 may be used in this manner to change slew rates of the power switches S1, S2, . . . S6 in real-time, within and between switching events, and optionally in an isolated manner to alter slew rates to be selected based upon operating conditions, desired performance, etc.

Figure 2:
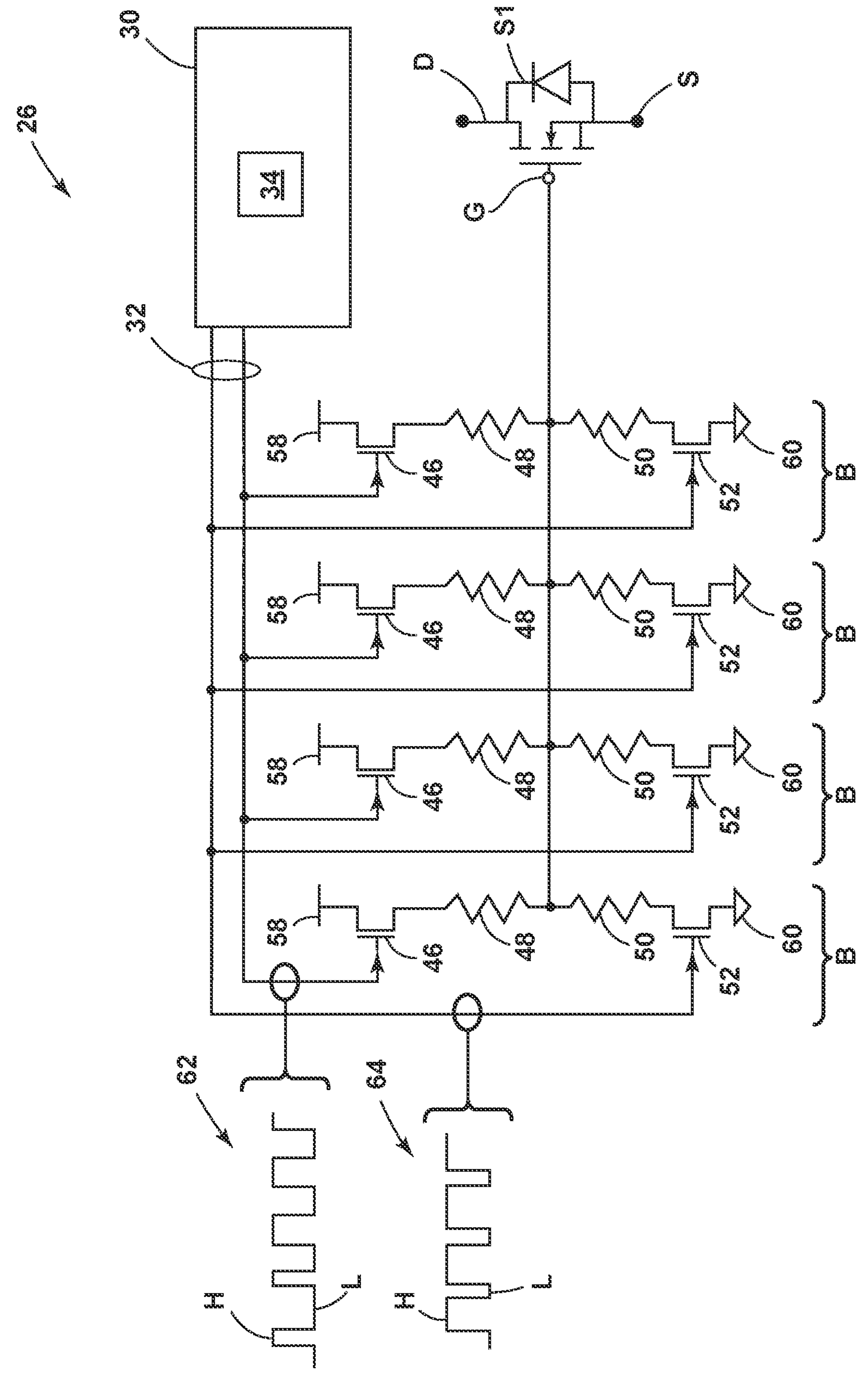
FIG. 2 illustrates a partial schematic view of a gate drive circuit in accordance with one non-limiting aspect of the present disclosure.

FIG. 2 illustrate a partial schematic view of one of the gate drive circuits 26 in accordance with one non-limiting aspect of the present disclosure. While the connection would be repeated separately for each switch S1, S2, . . . S6, the gate drive circuit 26 is shown for exemplary purpose as connected to a gate terminal G of the switch S1. The gate drive circuit 26 is shown in this manner as connectable to the gate terminal G due to the switch S1 being configured as a voltage and/or current controlled type of switch S1 whereby a gate voltage and/or a gate current provided to the gate terminal G may be used to transition the switch S1 between opened and closed states, i.e., to control switching events. In the event the switch S1 employed an alternative configuration, the gate drive circuit 26 may be similarly adapted to provide voltage and/or current to the corresponding terminal. The gate drive circuit 26 may include a plurality of branches B, with each branch B including an upper gate switch 46, an upper resistor 48, a lower resistor 50, and a lower gate switch 52. The upper gate switch 46 may be connected to an upper voltage source 58 and the lower gate switch 52 may be connected to a lower voltage source 60, optionally with each branch B singularly connected to the same upper and lower voltage sources 58, 60 or each branch separately connected to its own dedicated or separate set of upper and lower voltage sources 58, 60, i.e., each branch B may include a separate set of upper and lower voltage sources 58, 60, which in turn may be individually controlled with the gate controller 30 to provide the same or differing voltage levels. The upper gate switch 46 is shown to be connected in series with the upper voltage source 58, the upper resistor 46, the lower resistor 48, and the lower voltage source 60, with the upper gate switch 46 connected between the upper voltage source 58 and an upper side of the upper resistor 46, the gate terminal G connected between a lower side of the upper resistor 46 and an upper side of the lower resistor 48, the upper side of the lower resistor 50 connected to the lower side of the upper resistor 46, and the lower gate switch 52 connected between the lower voltage source 60 and a lower side of the lower resistor 50.

The gate driver 34 may be configured to generate the control signals 32 with separate control signals 62, 64 suitable for selectively opening and closing the upper and lower gate switches 46, 52, and thereby, controlling the gate voltage and/or current provided to the gate terminal G. The control signals 62, 64 may correspond with pulse width modulated (PWM) signals operable between a high voltage H and a low voltage L to correspondingly control the associated upper or lower gates switch 46,52 to a closed state and an opened state. A duty cycle of the control signals 32 may be varied to finely adjust the gate voltage and/or current at precise levels depending on the desired slew rate, e.g., to facilitate adjusting the slew rate in real-time according to desired operation of the electric machine 14. The PWM duty cycle control may be used to change the output current in and out of the switch's gate G (capacitor). The fastest gate speed and slew rates may be preferred for switching due to lag and energy consideration. A method that controls the PWM duty cycle may be based upon the DC bus voltage and current to allow optimal efficiency and reliability. For 400-800V system, for example, the present disclosure may be used to adapt the PIM 16 for each bus. In the illustrated configuration, the control signals 62, 64 may be operable for directing the gate drive circuits 26 to control a gate-source voltage (Vgs) between the gate terminal G and the source terminal of the switch S1, with the Vgs controlling the power transistors between the opened and closed states, and/or the control signals 62, 64 may be operable for directing the gate drive circuits 26 to control a gate current (Ig) to the gate terminal G, with the Ig controlling the power transistors between the opened and closed states. The Vgs and Ig provided to the gate terminal G may be proportional to a voltage difference between the upper and lower voltage sources 58, 60 and resistances of the upper and lower voltages 48, 50.

The gate driver 34 may be configured for providing the upper and lower gate switches 46, 52 differing control signals 32, such as in illustrated manner whereby the control signals 62, 64 may have differing duty cycles. This capability for individually varying the duty cycle or other aspects of the control signals 32 used to transition the upper and lower gate switches 46, 52 between states may be beneficial in enabling the gate controller 30 to control Vgs and/or Ig with a very fine and precise level of granularity, with the resulting voltage and current being set according to the upper and lower voltage sources 58, 60 and resistivity of the upper or lower resistors 48, 50. The gate controller 30 may optionally control the voltages provided with each of the upper and lower voltage sources 58, 60 to further enhance its capabilities for finely selecting the voltage and/or the current being provided to the gate terminal G. In some circumstances, for example, the control signals 32 may be used to selectively open or deactivate either one of the upper and lower gate switches 46, 52, optionally in concert with varying the voltages of the upper and lower voltage sources 58, 60, so as to thereby even further add to the specificity in selecting and achieving the desired slew rate. The gate drive circuits 26 may include a K quantity of the upper and lower resistors 48, 50, such as by including a K/2 quantity of the upper resistors 48 and a K/2 quantity of the lower resistors 50. The resistivity or resistive values of each of the K quantity of upper and lower resistors 48, 50 may be equal or distinct and individually selected prior to insulation and/or controllable after installation so as to provide a plurality of resistor combinations depending on whether the upper and/or lower gate switches 46, 52 associated therewith a corresponding control to the opened or closed state.

The resistor combinations may be individually arbitrated and used by the gate controller 30 in this manner to selectively control the slew rate of the power switches S1, S2, . . . . S6 connected to each of the gate drive circuits 26. The gate controller 30, for example, may be configured to assess the available resistor combinations, and based on desired operating performance, environment, sensor readings, etc., determine a selected resistor combination from the available resistor combinations for each of the control circuits 26. The gate controller 30 may include a lookup table or other logical construct capable of monitoring a wide variety of input conditions for use in determining the selected resistor combinations for the gate drive circuits 26. The gate drive controller 30, for example, may vary the selectively resistor combinations for one or more the power switches S1, S2, . . . S6, optionally in concert with selectively varying voltages for the upper and lower voltage sources 58, 60 of the corresponding branches B, so as to finely control the slew rates and the DC-to-AC conversion process of the PIM 16. The capability to adjust the slew rates in this manner may be beneficial in tailoring operation, or more specifically the slew rate of the switching events, of the power switches S1, S2, . . . S6 to account for influences, wear, and other factors affecting the electric machine 14 and the desirable AC input thereto.

Figure 3:
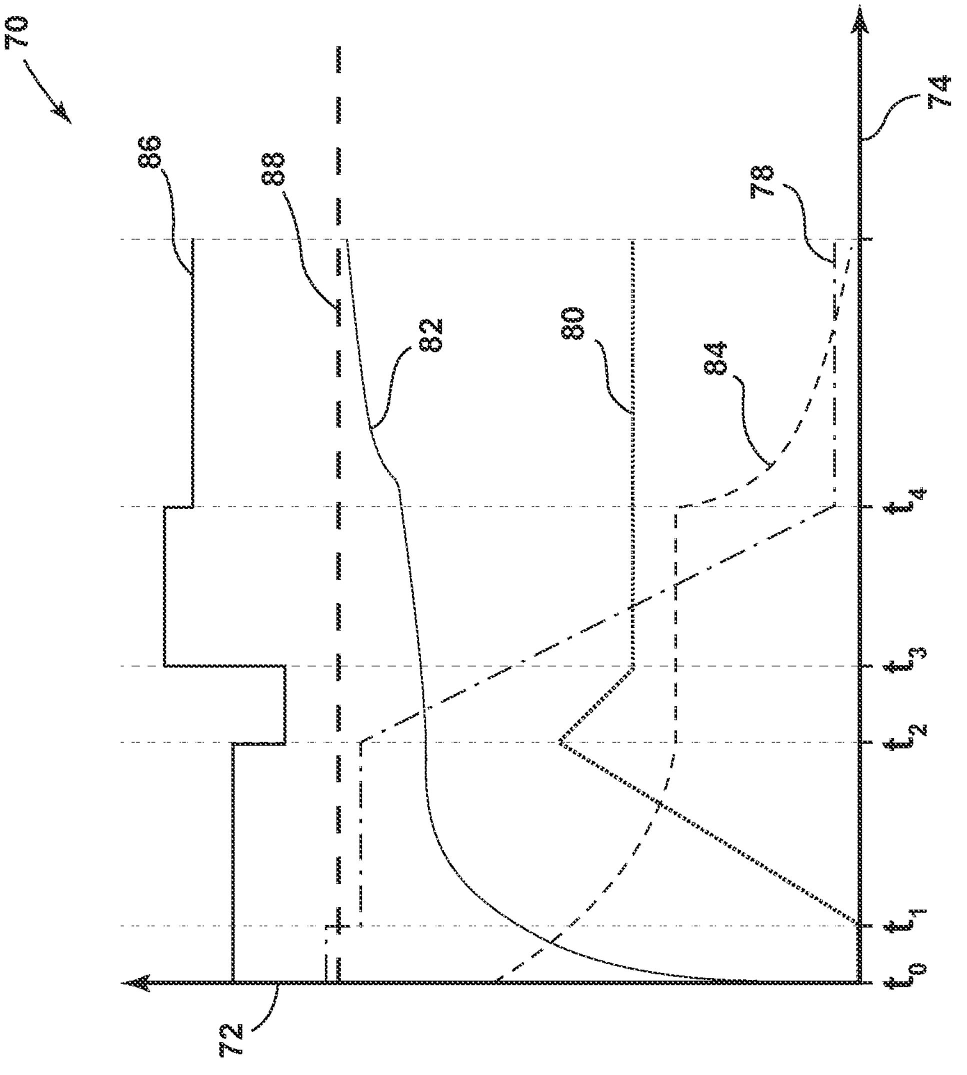
FIG. 3 illustrates a graph of controller slew rates in accordance with one non-limiting aspect of the present disclosure.

FIG. 3 illustrates a graph 70 for a method of controlling slew rate by varying the selected combination of resistors in accordance with one non-limiting aspect of the present disclosure. The graph 70 is shown to include a vertical axis 72 for voltage and current a horizontal axis 74 for time. A first waveform 78 represents voltage between the drain and source terminals (Vds), a second waveform 80 represents current through the drain terminal (Id), a third waveform 82 represents Vgs, a fourth waveform 84 represents Ig, a fifth waveform 86 represents voltage between gate and drain terminals (Vdg), and sixth waveform 88 represent an exemplary maximum Vgs (Vgs,max). The graph 70 illustrates an exemplary scenario whereby the slew rate of the switch S1, i.e., dV/dt and/or dI/dt, may be selectively controlled according to transitional properties of the switch S1. The period occurring prior to time T0 may correspond with the switch S1 being off or an active whereafter at time T0 the gate drive circuit 26 begins powering the gate terminal G at an initial slew rate. From time T0 to time T1 the initial slew rate may be maintained while Id increases. At approximately time T1, or slightly thereafter as the slope as the slope of Vgs lessens and/or as Vds drops, the D drive circuit may begin powering the gate terminal G at an intermediary slew rate, which may be useful in controlling a slope or a rate at which Vds correspondingly decreases. At approximately time T2, or once Vds reach or approaches its minimum, a greater slew may be implemented, optionally with additional slew rate adjustments at T3 and/or T4. The capability to selectively control Vgs and/or Ig during transitioning of the switch S1 may be beneficial in maximizing performance, or more particular the slew rate, as the switch S1 progresses through various states associated with transitioning from an open state to a closed state. The method may proceed in this manner whereby the slew rate for the drive circuits 26 and the attendant transitioning of the connected to switches S1, S2, . . . S6 may be implemented to control the DC to AC conversion needed for powering the electric machine 14.

Figure 4:
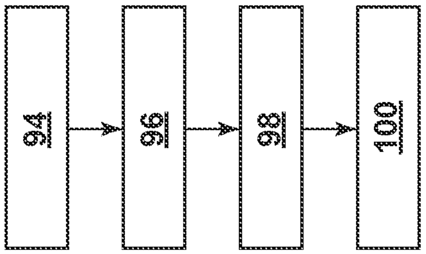
FIG. 4 illustrates a flowchart for a method of controlling slew rates in accordance with one non-limiting aspect of the present disclosure

FIG. 4 illustrates a flowchart for a method of controlling slew rates of the PIM 16 or other device in accordance with one non-limiting aspect of the present disclosure. Block 94 relates to a combination process for determining a plurality of resistors combinations available for the gate drive circuits. The combination process may include accessing on a per gate circuit basis the resistivity for each of the K quantity of the gate resistors 48, 50 and/or a capability of the gate controller 30 to set the resistivity therefor, as well as the available connections capable of being established between the gate resistors 48, 50, the branches B, and the upper and lower voltage sources 58, 60. The combination process may be predefined within lookup tables or otherwise determined by the gate controller 30 or otherwise indexed in a manner by which the gate resistors 48, 50 may be connectable to each other depending on the configuration of the corresponding gate drive circuit 26, i.e., based on the resistor combinations available therefor. The combination process may be particularly beneficial in identifying each available way in which the gate terminal G of each of the power switches S1, S2, . . . S6 may be driven depending on a selected combination of resistors.

Block 96 relates to a slew rate process for determining a selected slew rate for each of the power switches S1, S2, . . . S6. The slew rate process may include assessing one or more of a DC voltage of the DC source 20, a temperature of the DC link capacitor 24, a current of one or more of the AC output 38 and a junction temperature, a maximum discharge time, a drain-source voltage (Vds), or a voltage threshold (Vth) of one or more of the power switches S1, S2, . . . S6. The gate controller 30 may include a lookup table or other methodology for determining the slew rate that should be used or desired. Block 98 relates to a selection process for determining a selected resistor combination of the resistor combinations suitable for implementing the selected slew rate. The election process may occur on a per gate drive circuit basis such that the selected resistor combinations may be individually tailored to each of the gate drive circuits 26 and the desired slew rate therefor. In the event the resistor combinations available for a particular gate drive circuit 26 may be unable to achieve the preferred slew rate, the selected combination of resistors therefor may be selected to correspond with the resistor combination providing a closest match. Block 100 relates to a control process for generating the control signals 32 for the gate drive circuits 26 to implement the selected resistor combination and control conversion of the DC input to the AC output the selected slew rate.

As supported above, the present disclosure relates to a system and method to achieve real-time slew rate (SR) control of power transistors for inverters and converters by paralleling and/or serializing gate charging and discharging sub-circuits of the gate drive circuits to change slew rates in real-time, maximizing number of slew rates by external resistor design. Differing Vgs plus duty cycle control may be employed to overcome the droops in the dynamic response of gate charging and discharging while maintaining Vgs within limits. Feedforward control may be utilized using look up tables (LUTs) to alter slew rate based upon operating conditions, i.e. Vdc, current, Vth, and junction temperature, which may include control based upon operation conditions, transistor signal sensing, and part-to-part variation and degradation, and tune gate resistors and gate current sources of each ON and OFF branches for these conditions. Slew rate control may be operable to compensate for transistor/switch part-to-part variations, i.e. Vth, gate resistor, stray inductance, and in particular, to use parallel/serialization control to control slew rate to realize capacitor discharge while managing the I/V overshoots, and tuning the gate resistance or current for each gate resistor branch or gate current branch to attenuate the current ripples, and high order harmonics associated with motor losses. The present disclosure may include minimal amounts of hardware as a voltage/current source and a low-voltage switch, with pulse modulation to control the gate current to realize numerous slew rates. This may equivalently transform the gate drive circuit into a charge pump for the gate capacitor, enabling advantageous methods of control through variable-speed gate drive circuits allowing fine tuning of switching performance to optimize between loss, overshoot, EMI, and bearing current. In this manner, the gate drive circuits may be operable for turning on/off the power switches to converter electrical power between DC and AC, optionally with faster switching, minimal switching loss and improved max power capability, thereby limiting the effects of electrical stress on power switches, ringing, conductive and radiated EMI, and motor terminal voltage overshoot (PDIV) and bearing current.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. "A", "an", "the", "at least one", and "one or more" are used interchangeably to indicate that at least one of the items is present. A plurality of such items may be present unless the context clearly indicates otherwise. All values of parameters (e.g., of quantities or conditions), unless otherwise indicated expressly or clearly in view of the context, including the appended claims, are to be understood as being modified in all instances by the term "about" whether or not "about" actually appears before the value. A component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A slew rate controllable system for powering an electric machine, comprising:

a plurality of power switches operable for converting a direct current (DC) input into an alternating current (AC) output suitable for electrically powering the electric machine, the power switches operable between an opened state and a closed state to facilitate generating the AC output; and a gate drive system operable for controlling a slew rate associated with transitioning the power switches between the opened and closed states, the gate drive system including a plurality of gate drive circuits individually connected to a gate terminal of an associated one of the power switches, the gate drive circuits including a plurality of resistor combinations available connectable to the gate terminal of the associated one of the power switches, wherein;

a quantity of the resistors for each of the gate drive circuits equals K, with a K/2 quantity of the resistors corresponding with upper resistors and a K/2 quantity of the resistors corresponding with lower resistors, the upper resistors connecting in series with the lower resistors, with the gate terminal associated therewith connecting between each of the upper and lower resistors;

the resistors for each of the gate drive circuits are arranged into a K/2 quantity of branches, with each branch including one of the upper resistors and one of the lower resistors; and a selected resistor combination of the resistor combinations sets the slew rate for the switch associated therewith.

2. The slew rate controllable system according to claim 1, wherein:

the gate drive system includes a gate controller operable for determining the selected resistor combination for each power switch to optimize the slew rate.

3. The slew rate controllable system according to claim 2, wherein:

the gate drive system includes a gate driver operable for providing the gate drive circuits with a control signal suitable for implementing the selected resistor combination and controlling the power switches to generate the AC output.

4. The slew rate controllable system according to claim 3, wherein:

the control signals are operable for directing the gate drive circuits to control a gate-source voltage (Vgs) between the gate terminal and a source terminal of the switch associated therewith, the Vgs controlling the power switches between the opened and closed states.

5. The slew rate controllable system according to claim 1, wherein:

the gate drive system singularly includes an upper voltage source and a lower voltage source for each branch.

6. The slew rate controllable system according to claim 3, wherein:

the gate drive system separately includes an upper voltage source and a lower voltage source for each branch.

7. The slew rate controllable system according to claim 6, wherein:

each branch includes an upper gate switch and a lower gate switch, the upper gate switches connecting in series between one of the upper voltage sources and one of the upper resistors, the lower gate switches connecting in series between one of the lower voltage sources and one of the lower resistors.

8. The slew rate controllable system according to claim 7, wherein:

the gate drive circuits provide a gate voltage to the gate terminal connected therewith, the gate voltage being proportional to a voltage difference between the upper and lower voltage sources and resistances of the selected resistor combination.

9. The slew rate controllable system according to claim 8, wherein:

the control signals are configured to selectively control the upper and lower gate switches between opened and closed states and thereby the selected resistor combination.

10. The slew rate controllable system according to claim 9, wherein:

the control signals are pulse width modulated (PWM) signals operable between a high voltage and a low voltage, the high voltage transitioning the upper or lower gate switch in receipt thereof to the opened state and the low voltage transitioning the upper or lower switch in receipt thereof to the closed state.

11. The slew rate controllable system according to claim 10, further comprising:

a DC link capacitor connected between the power switches and a DC source providing the DC input, the gate controller selecting the control signals to optimize discharge speed of the DC link capacitor to avoid or minimize voltage overshoot of the power switches when transitioning between the opened and closed states.

12. The slew rate controllable system according to claim 11, wherein:

the gate controller is configured for selecting the control signals as a function of one or more of a DC voltage of the DC source, a temperature of the DC link capacitor, a current of one or more of the AC output and a junction temperature, a maximum discharge time, a drain-source voltage (Vds), or a voltage threshold (Vth) of one or more of the power switches.

13. A method for controlling slew rates of power inverter module operable for powering an electric machine, the power inverter module including a plurality of power switches operable for converting a DC input to an AC output suitable for powering the electric machine, the method comprising:

determining a plurality of resistor combinations available for a plurality of gate drive circuits, the gate drive circuits individually connected to a gate terminal of an associated one of the power switches, wherein:

a quantity of the resistors for each of the gate drive circuits equals K, with a K/2 quantity of the resistors corresponding with upper resistors and a K/2 quantity of the resistors corresponding with lower resistors, the upper resistors connecting in series with the lower resistors, with the gate terminal associated therewith connecting between each of the upper and lower resistors; and the resistors for each of the gate drive circuits are arranged into a K/2 quantity of branches, with each branch including one of the upper resistors and one of the lower resistors;

determining a selected slew rate for the power switches;

determining a selected resistor combination of the resistor combinations suitable for implementing the selected slew rate; and generating control signals for the gate drive circuits to implement the selected resistor combination and control conversion of the DC input to the AC output.

14. The method according to claim 13, further comprising:

determining the selected slew rate as a function of one or more of a DC voltage of a DC source providing the DC input, a temperature of a DC link capacitor connected to the DC input, a current of the AC output and a junction temperature, a maximum discharge time, a drain-source voltage (Vds), or a voltage threshold (Vth) of one or more of the power switches.

15. A power inverter module having controllable slew rates, comprising:

a plurality of power switches operable for converting a direct current (DC) input into an alternating current (AC) output suitable for electrically powering a traction motor of a vehicle, the power switches operable between an opened state and a closed state to facilitate generating the AC output; and a gate drive system operable for controlling a slew rate associated with transitioning the power switches between the opened and closed states, the gate drive system including a plurality of gate drive circuits individually connected to a gate terminal of an associated one of the power switches, the gate drive circuits including a plurality of resistor combinations connectable to the gate terminal of the associated one of the power switches, wherein;

a quantity of the resistors for each of the gate drive circuits equals K, with a K/2 quantity of the resistors corresponding with upper resistors and a K/2 quantity of the resistors corresponding with lower resistors, the upper resistors connecting in series with the lower resistors, with the gate terminal associated therewith connecting between each of the upper and lower resistors;

the resistors for each of the gate drive circuits are arranged into a K/2 quantity of branches, with each branch including one of the upper resistors and one of the lower resistors; and a selected resistor combination of the resistor combinations sets the slew rate for the power switch associated therewith.

16. The power inverter module according to claim 15, wherein:

the gate drive system generates pulse width modulated (PWM) signals for controlling a plurality of gate switches of the gate drive circuits to control the slew rate and the AC output, the PWM signals operable between a high voltage and a low voltage, the high voltage transitioning the gate switch in receipt thereof to the opened state and the low voltage transitioning the gate switch in receipt thereof to the closed state.

17. The power inverter module according to claim 16, wherein:

the upper resistors connecting to an upper voltage source via one of the gate switches, and the lower resistors connecting to a lower voltage source via another one of the gate switches.

18. The power inverter module according to claim 17, wherein:

the gate drive system includes a gate driver operable for providing the gate drive circuits with a control signal suitable for implementing the selected resistor combination and controlling the power switches to generate the AC output.

19. The power inverter module according to claim 18, wherein:

the gate drive circuits provide a gate voltage to the gate terminal connected therewith, the gate voltage being proportional to a voltage difference between the upper voltage source and the lower voltage source and resistances of the selected resistor combination.

20. The power inverter module according to claim 19, wherein:

each branch includes an upper gate switch and a lower gate switch, the upper gate switches connecting in series between one of the upper voltage sources and one of the upper resistors, the lower gate switches connecting in series between one of the lower voltage sources and one of the lower resistors; and the control signals are configured to selectively control the upper gate switches and the lower gate switches between the opened state and the closed state and thereby the selected resistor combination.

* * * * *